Jan. 29, 1963 E. F. DALY 3,075,386

RADIATION DETECTORS

Filed Jan. 15, 1960

Inventor
EDGAR FRANK DALY
By
Holcombe, Wetherill & Brisebois
Attorney

United States Patent Office 3,075,386

Patented Jan. 29, 1963

3,075,386

RADIATION DETECTORS

Edgar F. Daly, Cambridge, England, assignor to Unicam Instruments Limited, Cambridge, England, a company of Great Britain Filed Jan. 15, 1960, Ser. No. 2,623
Claims priority, application Great Britain Jan. 27, 1959
7 Claims. (Cl. 73—355)

The present invention relates to radiation detectors, and more particularly to dectors of radiation, such as infra-red radiation, which operate by means of a thermal mechanism, the radiation being incident on a receiver which is thereby raised in temperature. In a thermocouple this rise in receiver temperature is transmitted to a thermo-electric junction and a thermoelectric voltage results which may be observed by a galvanometer or other indicating device, if necessary after amplification. In a bolometer the rise in temperature causes a resistance change in the receiver and this in turn gives rise to a change in current when a given voltage is applied, the change in current being registered on an indicating device.

One of the difficulties in constructing thermocouples and bolometers having high sensitivity in the long wave-length infrared and microwave regions is that of securing efficient absorption of incident radiation by the receiver. Hitherto a coating of a black material, such as a layer of gold evaporated in a pressure of a few millimetres of nitrogen has been used to give the receiver high absorbing power. However, to be effective such a black coating must have surface irregularities of the same dimensions as the wavelength of the incident radiations and must therefore become so thick for long wave-length absorption that the thermal capacity is unduly increased.

Another absorption mechanism is possible which is not wavelength sensitive in this way. In this mechanism a thin conducting film of appropriate resistance intercepts the radiation and absorbs it in a manner similar to that of the appropriate resistive termination of a coaxial cable or waveguide for microwave frequencies.

According to the present invention a radiation detector comprises a thin supporting sheet or film of electrically insulating material carrying on one surface an absorbing electrically conducting film for intercepting and absorbing incident radiation and carrying on its other surface a second electrically conducting film opposite to the first film and serving to receive heat transmitted thorugh the insultaing support from the first film, said second electrically conducting film forming part of a thermocouple or bolometer.

The insulating supporting material preferably consists of a thin film of a material such as collodion, i.e. a nitrocellulose compound soluble in a mixture of alcohol and ether, or Formvar.

The absorbing film is constructed so as to have an appropriate resistance to intercept the radiation and absorb it at the operating temperature of the radiation detector and may be made of metal, for example, of aluminum, gold or nickel, or of a semi-metal such as bismuth, or a semi-conductor such as selenium or tellurium.

Where the receiver film is to form part of a thermocouple, it may be made for example of gold and the points of two wires of thermoelectric materials may be placed in contact with the receiver film to form the hot junction of a thermocouple. Where the receiver film is to form part of a bolometer, it may make contact with metal electrodes carried by the insulating support and which are themselves connected to wire through which an electric current may be fed.

In order that the invention may be more fully understood reference will now be made to the accompanying drawing, in which.

Figure 1:
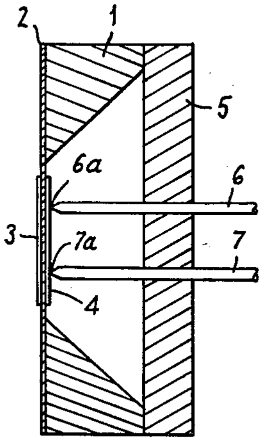
FIGURE 1 is a diagram representing a section through a radiation dectector according to the invention in the form of a thermocouple.
Figure 2:
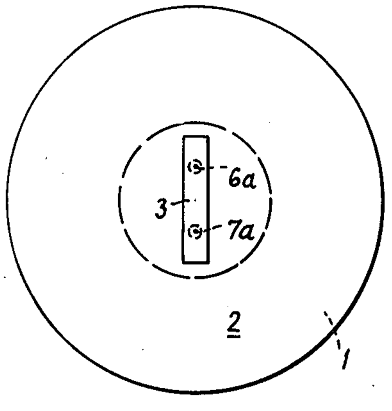
FIGURE 2 is a plan view of the device in FIGURE 1.

Referring to FIGURES 1 and 2, the device is of generally cylindrical form and comprises an annular support 1 over one end of which is mounted a very thin plastic film 2 made of collodion. A rectangular area 3 of absorbing metal is deposited on the outer surface of the collodion film, for example by evaporation of aluminum, and on the opposite surface of the collodion film is formed a metallic receiver element 4 over an area corresponding to the area 3, and consisting of a layer of gold deposited by evaporation. The opposite end of the annular support to that carrying the collodion film 2 is closed by an insulating cover 5 through which extend two wires 6 and 7 of thermoelectric materials having sharp points *6a* and *7a* which are in contact with the gold receiver film 4 and are lightly welded to it by a condenser discharge welding process. Heat absorbed by the aluminum absorber film 3 is then transmitted through the base plastic film 2 to the gold receiver film 4, the temperature of which rises. The gold receiver film 4 and the two point contacts *6a* and *7a* of thermoelectric materials form the hot junction of a thermocouple.

Figure 3:
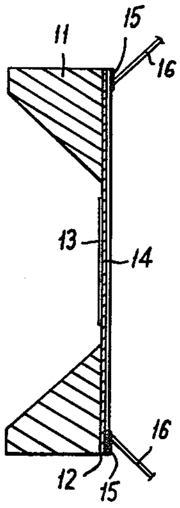
FIGURE 3 is a diagram representing a section through a radiation detector according to the invention, in the form of a bolometer.
Figure 4:
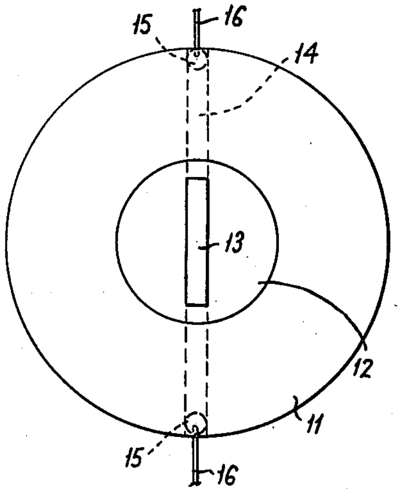
FIGURE 4 is a plan view of the device in FIGURE 2.

In the embodiment of FIGURES 3 and 4, an annular insulating support 11 has positioned over one end a very thin plastic film 12 of collodion on one surface of which is deposited an area 13 of absorbing metal film, for example by evaporation. This film may consist of gold or nickel. The opposite surface of the insulating film carries a receiver film 14 which extends over and beyond the area of the film 13 on which radiation is to be received, and is connected to electrodes 15 formed by metal deposits. Connecting wires 16 are connected with the electrodes 15 so that an electric current can be fed through the receiver film, changes in the current or voltage being observed with changes in the incident radiation on the receiver film 13.

The present invention provides a radiation detector which has high sensitivity over a wide spectral range including the long wavelength infra red and microwave regions and which can be used over a temperature range extending from room temperatures down to liquid air temperatures.

It will be understood that the conducting film can be formed of other substances besides those specifically mentioned which are given solely by way of example.

I claim:

1. A radiation detector comprising a thin supporting film of electrically insulating material carrying on one surface an absorbing electrically conducting film for intercepting and absorbing incident radiation and carrying on its other surface a second electrically conducting film opposite to the first electrically conducting film and serving to receive heat transmitted through the insulating support from said first electrically conducting film, said second electrically conducting film forming part of an electrical detecting circuit.

2. A radiation detector as claimed in claim 1, in which the insulating supporting material consists of a thin film of collodion.

3. A radiation detector as claimed in claim 1, in which the heat receiving film is to form part of a thermocouple and has the points of two wires of thermoelectric materials placed in contact with said film to form the hot junction of the thermocouple.

4. A radiation detector as claimed in claim 1, in which the heat receiving film is to form part of a bolometer and makes contact with metal electrodes carried by the insulating support and which are themselves adapted to be connected to wires through which an electric current can be fed.

5. A radiation detector as claimed in claim 1, comprising an annular support over one end of which is mounted the thin film of insulating material carrying the absorbing film and the heat receiving film respectively on its opposite surfaces.

6. A radiation detector comprising a support, a thin film of electrically insulating material carried by said support, a radiation absorbing metallic layer for intercepting and absorbing incident radiation on one surface of the film of insulating material, a second metallic layer on the opposite surface of the insulating film opposite the first metallic layer and serving to receive heat transmitted through the insulating support from the first layer and two point contacts of thermoelectric material in contact with said second layer, said contacts forming the hot junction of a thermocouple.

7. A radiation detector comprising a support, a thin film of electrically insulating material carried by said support, a radiation absorbing metallic layer for intercepting and absorbing incident radiation on one surface of the film of insulating material, a second metallic layer on the opposite surface of the insulating film opposite the first metallic layer and serving to receive heat transmitted through the insulating support from the first layer and spaced metal electrodes in contact with said second layer and arranged so that it acts as a bolometer.

References Cited in the file of this patent

UNITED STATES PATENTS

| | | |
|---|---|---|
| 2,526,491 | Liston | Oct. 17, 1950 |
| 2,587,674 | Aiken | Mar. 4, 1952 |
| 2,728,835 | Mueller | Dec. 27, 1955 |
| 2,824,235 | Hahn | Feb. 18, 1958 |
| 2,879,424 | Garbuny | Mar. 24, 1959 |
| 2,935,711 | Christensen | May 3, 1960 |